United States Patent [19]

Hogen

[11] Patent Number: 4,536,988
[45] Date of Patent: Aug. 27, 1985

[54] AQUATIC BIOMASS CONTAINMENT BARRIER AND METHOD OF ASSEMBLING SAME

[75] Inventor: Delman R. Hogen, Minneapolis, Minn.

[73] Assignee: The Lemna Corporation, Minneapolis, Minn.

[21] Appl. No.: 575,331

[22] Filed: Jan. 31, 1984

[51] Int. Cl.³ .............................................. A01G 7/00
[52] U.S. Cl. ........................................ 47/1.5; 47/58; 47/59; 47/85; 56/8; 119/2; 210/602; 405/21
[58] Field of Search .................... 47/1, 1.4, 65, 59–64, 47/58, 85; 210/602; 405/21, 23, 26, 27, 219, 250 A; 119/2, 3; 56/8, 9

[56] References Cited

U.S. PATENT DOCUMENTS

| | | | |
|---|---|---|---|
| 2,283,472 | 5/1942 | Fuxhorn | 119/3 |
| 3,155,609 | 11/1964 | Pampel | 210/602 |
| 3,385,786 | 5/1968 | Klock | 210/602 |
| 3,456,385 | 7/1969 | Plath | 47/63 |
| 3,653,192 | 4/1972 | Bryant | 56/9 |
| 3,839,198 | 10/1974 | Shelef | 47/1.4 X |
| 3,911,514 | 10/1975 | Ito | 9/8 R |
| 3,927,491 | 12/1975 | Fearnsworth | 47/62 |
| 3,959,923 | 6/1976 | Selke | 47/1.4 |
| 4,133,141 | 1/1979 | Lee | 47/59 |
| 4,169,050 | 9/1979 | Serfling et al. | 210/242 X |
| 4,209,943 | 7/1980 | Moeller et al. | 47/65 |
| 4,320,594 | 3/1982 | Raymond | 47/59 |
| 4,324,067 | 4/1982 | Kessler | 47/1.4 |
| 4,333,837 | 6/1982 | Plosz et al. | 210/602 |
| 4,382,348 | 5/1983 | Kitsu et al. | 47/59 |
| 4,487,588 | 12/1984 | Lewis et al. | 47/59 |

FOREIGN PATENT DOCUMENTS

| | | | |
|---|---|---|---|
| 241896 | 12/1964 | Austria | 47/63 |
| 2239120 | 3/1975 | France | 47/1.4 |
| 2361060 | 8/1976 | France | 47/59 |
| 1373035 | 11/1974 | United Kingdom | 405/27 |
| 906455 | 2/1982 | U.S.S.R. | 47/59 |

OTHER PUBLICATIONS

"Megator", Mini Boom Brochure, Megator Corp. 562 Alpha Drive, Pittsburgh, PA 15238.
"Mud Cat" Brochure *Mudcat Div. National Car Rental System, Inc.*, P.O. Box 16247, St. Louis Park, Minn. 55416.

*Primary Examiner*—James R. Feyrer
*Attorney, Agent, or Firm*—Merchant, Gould, Smith, Edell, Welter & Schmidt

[57] ABSTRACT

The present invention relates to a floating containment barrier grid structure (20) for containment of floating aquatic plants (26) in a body of water (30). The barrier grid structure (20) includes a plurality of interconnected square barrier segments (24), the top edge of the barrier segments extending above the surface of the water so as to prohibit substantial wave action. The floating containment barrier grid structure (20) being anchored by cables (38) and stakes (40) in a somewhat tensioned state while floating in the body of water (30). The barrier grid structure (20) being tensioned to enable portions of the barrier grid structure (20) to be submerged beneath the surface of the water by a harvesting machine (28) while harvesting the floating aquatic plants (26).

11 Claims, 8 Drawing Figures

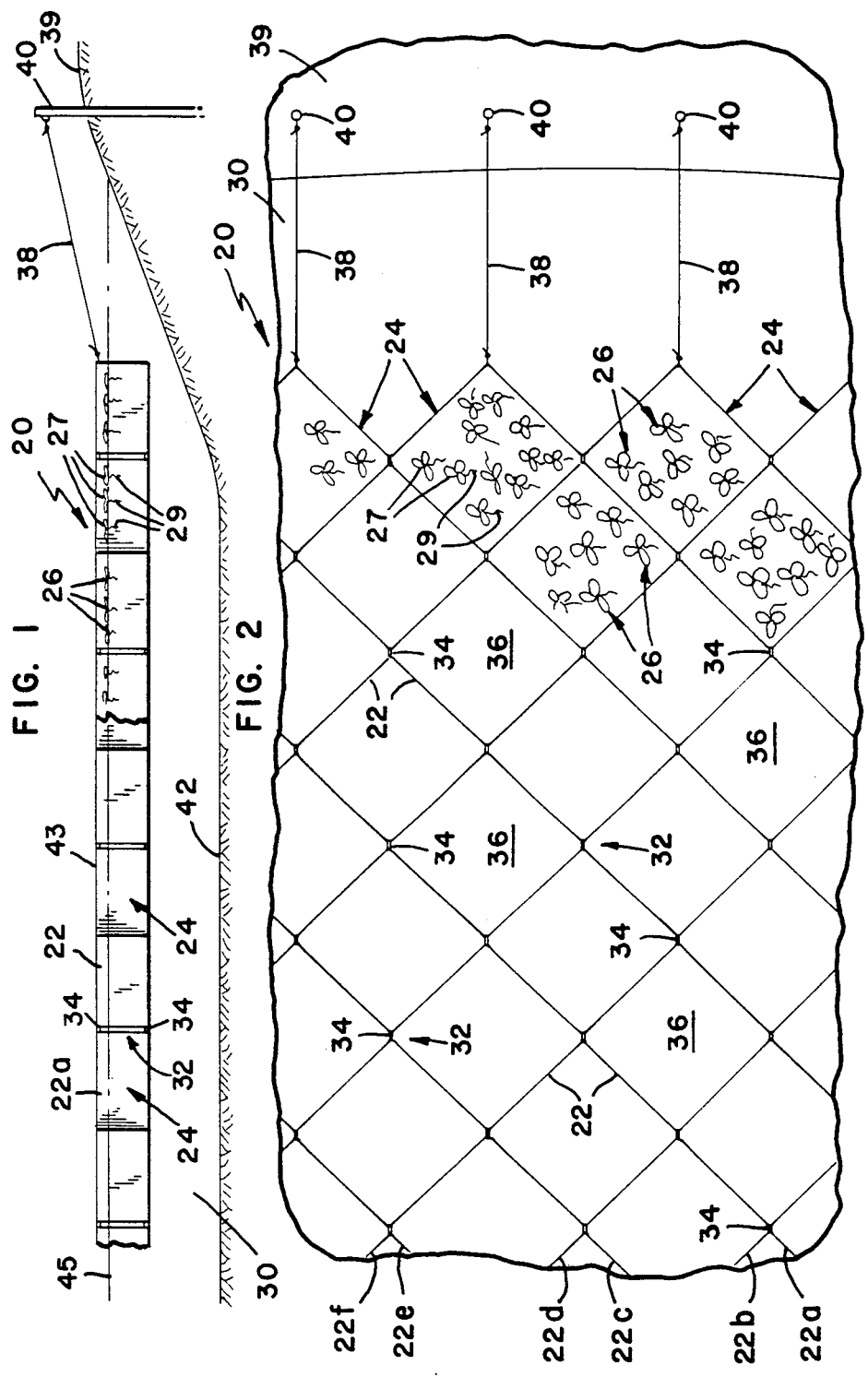

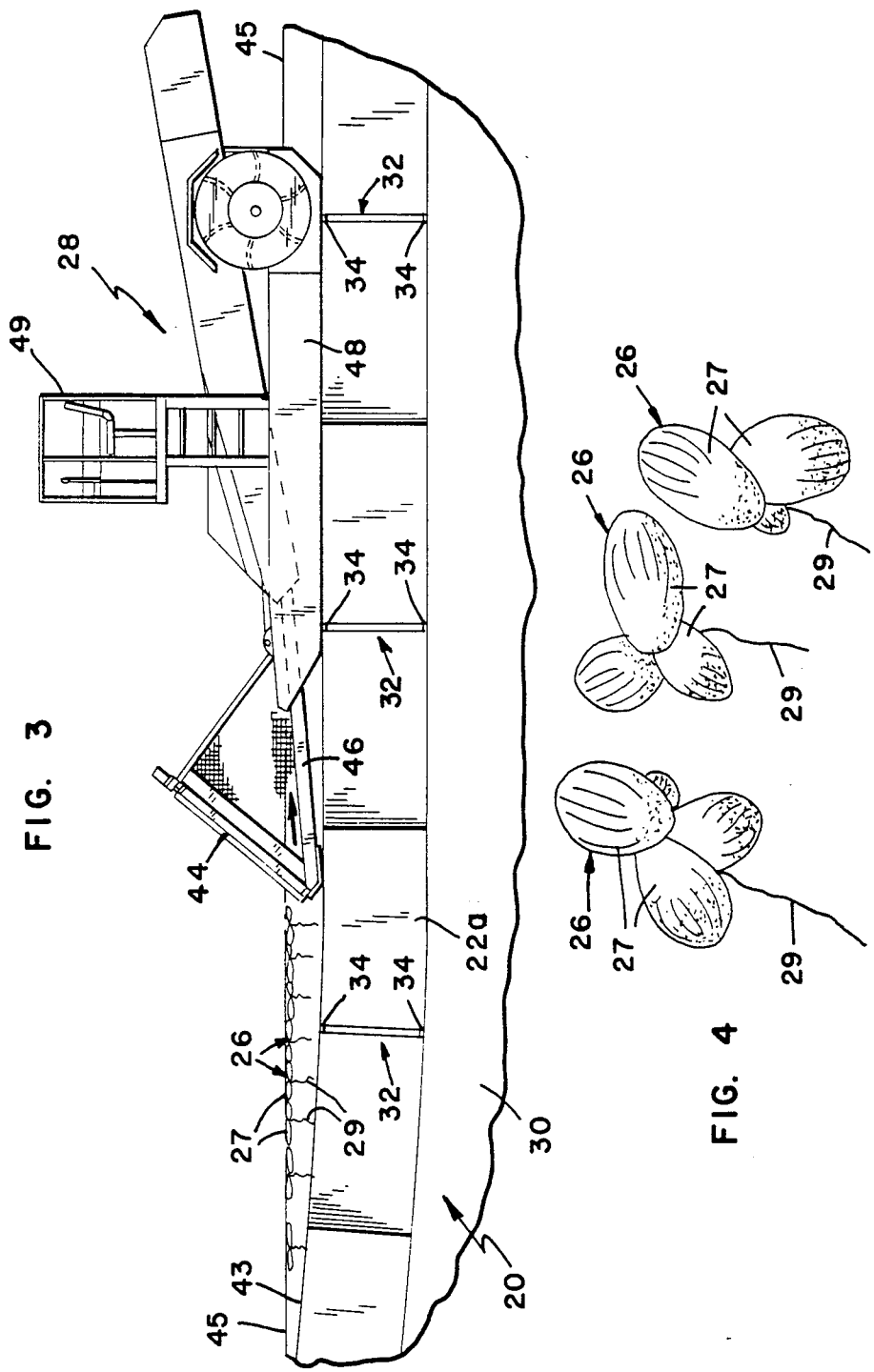

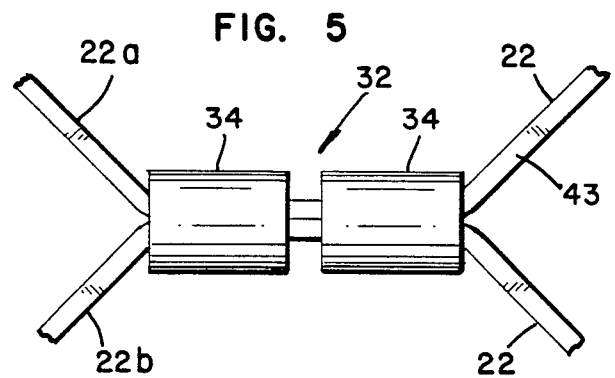
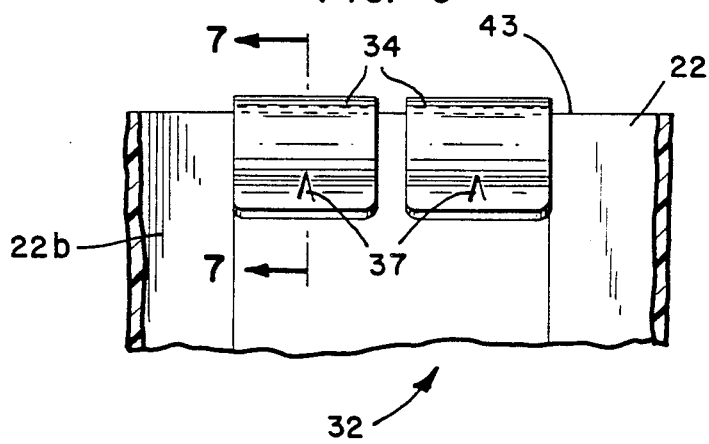
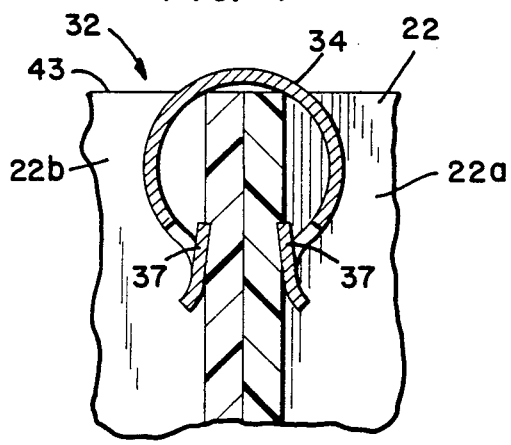

AQUATIC BIOMASS CONTAINMENT BARRIER AND METHOD OF ASSEMBLING SAME

BACKGROUND OF THE INVENTION

The present invention relates to a biomass producing system and in particular to a floating barrier network which will be used to contain aquatic plants, in particular floating aquatic plants which are members of the duckweed family, and maintain their location on the surface of a waste treatment pond or natural body of water.

There has been research conducted in an attempt to ascertain the feasibility of utilizing aquatic plants for the treatment of wast water and/or improve water quality. Separate research has been conducted to ascertain the feasibility of utilizing aquatic plants as a food source or cash crop. Most of this research has concentrated on the use of nonfloating aquatic plants. There has been very little research regarding the use of an aquatic plant for both waste water treatment and as a food source.

Recently researchers have turned their attention to the use of floating aquatic plants and in particular, plants of the duckweed family. The duckweed family of plants provide for a biomass producing system wherein unwanted nutrients are harvested from aquatic systems by means of bioaccumulation to treat waste water and/or improve water quality, and the plants harvested as a cash crop. The duckweed are particularly suited to this purpose as they are native plants to most of the world including the United States and have the capability of rapidly taking up nutrients from an aquatic environment to provide a food source with a high nutritional and protein content. The natural development of these plants has produced wild type strains which can grow throughout the year given an open water condition. In addition, these plants have developed a pest resistance which is missing in other cash crops. This natural resistance to pests makes these plants a nearly pesticide free and herbicide free operation.

The University of Louisiana has conducted research with the duckweed species. However, The research to date has been limited to very small ponds. In order to enable efficient commerical utilization of the duckweed species for waste water treatment or an entrophic lake system, the duckweed species must be capable of being utilized in large bodies of water. However, a floating aquatic plant does not attach itself to the bottom of the pond or other body of water and is subject to wave action on large bodies of water. The wave action will push the aquatic plants to a localized area thereby causing destruction of the plants and reducing their growth and reproduction efficiency as the surface contact with the nutrients in the water is reduced. It is essential that floating aquatic plants be evenly dispersed over the surface of the water to maximize their surface contact with the water and thus maximize their growth and reproduction.

The use of a multiplicity of ponds small enough to reduce the fetch or linear measure of area that the wind acts on to create waves such that the wave action is minimized, would be prohibitively expensive for the treatment of waste water on a large scale. In addition, the treatment of entrophic water systems in an efficient manner is not possible because of their fetch.

An efficient large scale commercial system utilizing floating aquatic plants and particularly members of the duckweed family for both harvesting unwanted nutrients and as a source of food for animals and humans alike, has not yet been developed to take advantage of these types of plants.

The present invention makes the large scale application of floating aquatic plants in the treatment of waste water and as a cash crop, economically feasible.

SUMMARY OF THE INVENTION

The present invention relates to a floating containment barrier grid structure for containment of floating aquatic plants in a large body of water. The barrier grid structure includes elongated flexible sheets of material having a top edge and a bottom edge and having a predetermined thickness and width, the thickness of the sheets being substantially less than the width of the sheets. The sheets have two sides and define a longitudinal axis and a transverse axis and have a specific gravity between 0.7 and 0.95. Interconnecting means interconnect the sides of the sheets at spaced intervals along their longitudinal axis to form a plurality of barrier sections in a web-like arrangement. Each of the barrier sections has four sides defined by the sides of two of the said sheets. Each of the barrier sections further encloses substantially the same amount of water surface area. Means are provided for anchoring the interconnected sheets in a tensioned state while floating on the body of water, the transverse axis of the sheets lying in a vertical plane when so anchored. The top edge of the sheets is above the surface of the water with the bottom edge of the sheets being mostly off the bottom of the water in a floating condition. A majority of surface area of the sheets is below the surface of the water. The top edge of the sheets extends above the surface of the water by an amount which exceeds the maximum achievable wave height defined as 0.105 times the square root of the maximum linear measure of space across one of the barrier sections. The barrier grid structure is necessarily tensioned to enable portions of the barrier grid structure to be submerged beneath the surface of the water by a harvesting device while harvesting the floating aquatic plants.

The present invention further relates to a method of assembling a floating containment barrier grid structure for containment of floating aquatic plants in a body of water. The method includes the step of interconnecting adjacent sheets of material of a plurality of sheets of material aligned side by side. The interconnection is made at spaced intervals along the longitudinal axis of the sheets of material to form a plurality of interconnected square barrier segments, the four sides of each barrier segments being formed by two of the sheets, the sheet having a specific gravity less than that of water. Once the barrier segments are formed, they are pulled into the body of water. The corners of the barrier segments about the periphery of the barrier grid structure are secured to prevent lateral movement of the barrier segments over the surface of the water. A majority of the barrier segments float in the water off the bottom thereof, a top edge of the barrier segements extending above the surface of the water to prevent wave action.

The present invention thus provides a floating network which will be used to contain aquatic plants and maintain their location on the surface of a waste treatment pond or natural body of water. The invention is an important part of a process of bioaccumulation which uses duckweed or other floating aquatic plants to remove, through their growth processes, an excess nutrient load from a body of water. The resulting lattice of barrier segments will serve the double function of maintaining an even dispersion of plants on the surface of the water, thus maintaining a maximized surface contact, and at the same time minimizing the process of wave building on the surface of the water. Additionally, the containment barrier segments will be constructed in such a way that they can be submerged easily by a floating harvesting device and then returned to their former state after the harvester has passed.

The containment barrier segments will be constructed of a material which will have a specific gravity such that it will maintain the largest portion of the barrier below the surface of the water and leave sufficient exposed material above the surface to prevent wind or current generated waves from going over the top of the barrier.

The use of a floating aquatic plant for taking nutrients from water has the advantage of harvesting the plants from the surface, while the treated water can be released at the bottom of the system.

An advantage of the present invention is that a higher possible growth rate is recognized by keeping the plants evenly dispersed over the surface of the body of water to be treated. Since the plants are not attached to the bottom of the pond, stream, or lake, they would otherwise be pushed by wind or current action to the shore where they would cover a minimum surface area.

The barrier grid structure of the present invention will preferably be constructed in such a way that the harvester barge will submerge the barrier and float over it. After the harvester has passed over the barrier, the barrier grid structure will regain its former condition. Accordingly there is no need to remove the barrier grid structure during the harvesting process.

In the preferred embodiment, the portion of the barrier grid structure which will be above the water surface will be such that it exceeds the maximum achievable wave height which is described by the formula:

Max Wave Height $= 0.105 \times (\text{Maximum Fetch})^{\frac{1}{2}}$

Fetch is the linear measure of space that the wind may blow over to create waves.

The present invention provides an economical and environmentally harmless structure which enables the large scale use or commercialization of floating aquatic plants for taking unwanted nutrients from a body of water and providing a food, cash crop. The need for using a plurality of smaller ponds or growth channels in order to minimize wave build-up and assure uniform dispersion of the plants is done away with. Accordingly, the applicant's invention allows floating aquatic plants to be used on a large scale commercial basis to reduce nutrient loading, trace metals, suspended solids, etc. in waste water effluents and for a variety of other water quality problems.

These and various advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numeral and letters indicate corresponding parts throughout the several view, FIG. 1 is a diagrammatic side elevational view of a preferred embodiment of the present invention;

FIG. 2 is a top plan view of the embodiment shown in FIG. 1;

FIG. 3 is a diagrammatic side elevational view of a harvester being utilized with an embodiment of the present invention;

FIG. 4 is a perspective view of the duckweed plant;

FIG. 5 is a fragmentary top plane view illustrating an embodiment of the interconnection means of the present invention;

FIG. 6 is a side elevational view of the embodiment shown in FIG. 5;

FIG. 7 is a view as seen generally along line 7—7 of FIG. 6; and

FIG. 8 is a perspective view of an embodiment of the interconnection means of the present invention.

DETAILED DESCRIPTION OF THE PREFERRED EMBODIMENT

Referring now to the FIG. a preferred embodiment of the present invention, generally designated by the reference numeral 20 is shown in FIGS. 1 through 2. As illustrated, the invention is a floating containment barrier grid structure 20, preferably formed of ultraviolet resistant plastic sheets of material 22 interconnected so as to form a plurality of interconnected square barrier segments 24, which will be used to contain large populations of small floating aquatic plants 26 in relatively large bodies of water. The individual square barrier segments 24 of the barrier grid structure will allow the contained plant populations to achieve a maximum surface cover on the area to be treated. The floating barrier material 22, which will segment the plant populations, is preferably as thin as possible so that the barrier segments 24 will comprise the smallest possible portion of the pond area, and preferably of sufficient width such that the barrier segments 24 will float deep enough to prevent the plants 26 from being forced underneath the barrier by the wind or stream flow and yet ride high enough above the surface of the pond to prevent the plants from being blown over one barrier segment and into the next barrier segment.

A specific gravity of the barrier grid structure 20 is preferably about 0.7 to 0.95 so that, as illustrated in FIG. 3, a floating harvesting machine 28 can easily submerge local portions of the barrier grid structure 20 for the purpose of harvestng the plants 26 and their accumulated nutrient load.

The plants 26 will be grown on the surface of the water for the purpose of concentrating unwanted nutrients in the plant material, where the rapidly growing plants 26 can then be harvested to remove the nutrients. While the grid structure 20 has application for containment of any floating aquatic plants, one particular application is its use for containment of a species of the duckweed family (Lemna minor) which is particularly suited to waste water treatment and harvesting as a cash crop because of its rapid growth rate, capacity for high concentrations of phosphorus and nitrogen, and its potential protein content of forty to forty-five percent.

As illustrated in FIG. 4, Lemna minor is a small plant, several millimeters across the fronds of leaves 27, and has a free floating root system 29 which varies in length from a few millimeters to about five centimeters depending on certain nutrient availability. In order to maintain an even dispersion of the plants on the body of water under treatment, the above mentioned floating grid 20 must be installed over the entire or a majority of the working area of a pond 30.

The present invention is also particularly suited to other species of the duckweed family (Lemnaceae) such as *Lemna trisulca, Spirodela polyrihza, Wolffia columbiana* and a member of the liverwort family (Ricciaceae), *Riccia fluitans*.

The duckweed and liverwort species are native plants which are found over most of the United States and the world, and which have the capability of rapidly taking up nutients from an aquatic environment. The resulting plant mass must be harvested to complete the process of nutrient removal. The harvester machine 28 needed to perform this task will preferably push the barrier segments 24 under the water as it passes over the top of the plant mass. This is one of the reasons for using the tough polyethylene material and also the reason for using a material which has a specific gravity close to that of water, preferably 0.07 to 0.95.

These plants because of their high protein and nutritional content, are useful as livestock feed, and as a source of human food. The present invention enables these plants to be used for waste water treatment on a commercial basis, the harvested plants being sold as animal feed or human food. The resulting income from the sale of the harvested plants as a cash crop can be utilized to offset or eliminate the cost of operating a waste disposal system. This also holds true for pond, lake, or stream systems wherein the present invention can go a long way towards reducing the costs of cleaning up an entrophic (rapidly aging) lake system.

More particularly, in certain applications the barrier segments 24 may be constructed from 0.060 inch thick by 12 inch wide, black polyethylene which can be purchased in rolls of several hundred feet or more. The larger the roll of material, the fewer lap joints which will be required to assemble the overall barrier grid structure 20 of the present invention. The barrier grid structure 20 of the present invention will preferably be assembled on site thereby reducing costs substantially. Several rolls of sheets of the material 22 will be partially unrolled such that the sheets are aligned parallel to one another. The sheets of material from different rolls are illustrated in FIG. 2 as referecne numerals 22a through 22f. As illustrated in FIGS. 5 through 8, a V-shaped fold 32 will be made in each of the adjacent sheets 22. The V folds 32 will be brought together and a pair of U-shaped retainer clips 34 inserted in over each of the adjacent V folds 32. This will be done at evenly spaced intervals to form a plurality of the barrier segments 24 having a generally square configuration and being interconnected in a contiguous grid or lattice-like network. Each of the barrier segments 24 will contain an equal area 36 of water surface and have its sides formed by two of the sheets of material 22. It will be appreciated, that while the barrier segments 24 preferably have a square configuration, the configuration might be distorted by applying more tension in one direction on barrier grid structure 20. However, a nonsquare configuration is not as efficient since the linear fetch in one direction will be substantially increased over the direction substantially perpendicular thereto.

The corners of each of the barrier segments 24 will be secured by the retainer clips 34 which might for example be made of spring steel, beryllium copper, or molded plastic. As illustrated in FIG. 7 through 8, the retainer clips 34 will include a barb 37 for engaging the sheets of material 22 to prevent the retainer clips from sliding off. It will be appreciated that other methods in keeping with the principles of the present invention for attaching the sheets of material 22 might be utilized. Although the size of the barrier segments 24 might vary depending on the wind conditions at the site, the size of each of the barrier segments 24 in certain applications is preferably eleven feet by eleven feet with a fifteen foot diagonal measurement.

As the process of constructing the barrier grid structure 20 progresses, the barrier segments 24 will be pulled into the water from the opposite side of the pond 30 until the entire or a majority of the surface of the pond 30 is covered by the floating network. At this time the corners of the barrier grid structure 20 will be secured by cabling 38 attached to stakes or anchors 40 which will be placed outside the pond 30 on the shore 39 in most cases as illustrated in FIGS. 1 and 2, although the stakes might be positioned in the pond 30 itself. The cabling 38 will prevent the floating grid barrier 20 from lying over on its side due to the tension exerted on the system by the cabling 38. The barrier segments 24 will be floating in the pond above the bottom 42 with the transverse axis of the sheets of material 22 lying in a vertical plane.

As illustrated in FIG. 3, the harvester machine 28 utilized with the barrier grid structure 20 of the present invention will be preferably a floating unit such as the aquatic weed harvester, model H5-160 manufactured by the Mud Cat Division of National Car Rental System, Inc., Bos 16247, St. Louis Park, Minn., which can be adapted for use with the barrier grid structure 20 of the present invention with a minimum of modifications. The aquatic weed harvester is a self propelled floating barge which is manufactured to cut and remove large bottom growing aquatic weeds from lakes. The aquatic weed harvester has a harvesting head that cuts underwater weeds with a horizontal sickle bar cutter. Side feeders direct the cut weeds up an open mesh conveyer ramp. The mesh enables excess water to drain while the weeds are carried to a container where they remain until unloaded on shore. Since the plants intended for use with the present invention are floating on the surface of the water, the sickle bar cutter is not needed as the plants can be skimmed from the surface of the water. The conveyer, which is designed to move the cut plants from the water to the container or barge where stored until off-loaded at shore, will need to be equipped with a finer screen than presently used, because the duckweed plants are considerably smaller than the plants for which the machine was designed. The aquatic weed harvester might also be modified to include a dewatering device, probably a centrifugal system at the inboard end of the conveyer. The dewatering device will augment the harvesting by allowing more material to be harvested before the machine must be unloaded.

As illustrated in FIG. 3, as the harvester 28 floats over the grid barrier structure 20, a top edge 43 of the barrier grid structure 20 over which the harvester 28 is positioned will be forced below the surface of the pond 30 such that a harvesting head 44 can be positioned under the plants 26 to feed the plants up a conveyer 46 for storage in a container or barge 48. The harvester machine 28, as illustrated, will preferably include a cab 49 for the operator.

The separation of the plant populations by a grid barrier is critical to the operation of the bioaccumulation system, as it allows the population to maximize the cover of growing plants over the available surface area. The position maintenance is important because the population in an open water condition would be blown by the wind to the shoreline where it would pile up and decay rather than reproduce and take up nutrients from the water. The water systems where this design can be used are waste treatment ponds or natural bodies of water such as ponds, lakes, streams, or rivers.

The barrier grid 20 or network system is a critical part of this process of nutrient bioaccumulation because the process uses duckweed or other small floating aquatic plants to remove, through their growth processes, an excess nutrient load from a body of water.

The barrier grid structure 20 of the present invention will serve the double function of maintaining an even dispersion of plants on the surface of the water, thus maintaining a maximized surface contact, and at the same time minimizing the process of wave buildup on the surface of the water.

A higher possible growth rate can be attained by keeping the plants evenly dispersed over the surface of the body of water under treatment. Since these plants do not attach themselves to the bottom of the pond, stream, or lake, they would normally be pushed by wind or current action to the shore where they would cover a minimum surface area.

The use of a floating aquatic plant for taking nutrients from the water has the advantages of enabling the harvest of the plants from the surface, while the influent water can be distributed at the upstream end and the treated water can be released beneath the surface at the downstream end of the system. This allows for a continuous harvest of a flow-through water treatment system without disturbing the dynamics of either the plant growth process or the water movement through the system.

The portion of the barrier grid 20 which will be above the water surface 45 will be such that it exceeds the maximum achievable wave height which is described by the formula:

Max Wave Height $= 0.105 \times$ (Maximum Fetch)$^{\frac{1}{2}}$

Fetch is the linear measure of space that the wind may blow over to create waves. In the case of the eleven foot square barrier segments 24, the maximum design fetch is the fifteen foot diagonal measure of the barrier segments.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appended claim are expressed.

What is claimed is:

1. A floating containment barrier grid structure for containment of floating aquatic plants in a body of water, comprising:
a plurality of interconnected floating barrier sections, each barrier section having four sides arranged in a square configuration and enclosing the same amount of water surface area, the sides of said barrier sections having a top edge and a bottom edge, the sides lying in a vertical plane, said barrier sections having a specific gravity less than water, the top edge of said barrier sections extending above the surface of the water and the bottom edge of said barrier sections being off the bottom of the body of water, said barrier grid structure having sufficient elasticity to enable a portion of said barrier grid structure to be submerged below the surface of the water, the barrier grid structure being suitably anchored to prevent substantial lateral movement of said barrier sections across the surface of the water.

2. A structure in accordance with claim 1, wherein said barrier sections are formed by a plurality of sheets of material interconnected at evenly spaced intervals along their longitudinal extent.

3. A structure in accordance with claim 1, wherein said barrier sections have a specific gravity between 0.07 and 0.95.

4. A structure in accordance with claim 1, wherein the top edge of said barrier sections extends above the surface of the water by an amount which exceeds the maximum achievable wave height, defined as 0.105 times the square root of the maximum linear measure of space across one of the barrier sections.

5. A floating containment barrier grid structure for containment of floating aquatic plants in a body of water, comprising:
(a) enlongated flexible sheets of material having a top edge and a bottom edge and having a predetermined thickness and width, the thickness of said sheets being substantially less than the width of said sheets, and sheets having two sides and defining a longitudinal axis and a transverse axis, said sheets having a specific gravity between 0.7 and 0.95;
(b) interconnecting means for interconnecting the sides of said sheets at spaced intervals along the longitudinal axis to form a plurality of barrier sections in a web-like arrangement, each of said barrier sections enclosing substantially the same amount of water surface area; and
(c) means for anchoring said interconnected sheets in a tension state while floating in the body of water, the transverse axis of said sheets lying in a vertical plane, the top edge of said sheets being above the surface of the water, the bottom edge of said sheets being mostly off the bottom of the water, a majority of the surface area of the sheets being below the surface of the water, the top edge of said sheets extending above the surface of the water by an amount which exceeds the maximum achievable wave height, defined as 0.105 times the square root of the maximum linear measure of space across one of the barrier sections, said barrier grid structure being necessarily tensioned to enable portions of said barrier grid structure to be submerged beneath the surface of the water during harvesting of the floating aquatic plants by a harvesting device.

6. A structure in accordance with claim 5, wherein said sheets of material are made from a polyethylene material.

7. A structure in accordance with claim 5, wherein said interconnecting means includes a clip securing adjacent V-folds in the sheets.

8. A method of assembling a floating containment barrier grid structure for containment of floating aquatic plants in a body of water, said method comprising steps of:
  (a) interconnecting adjacent sheets of material of a plurality of sheets of material aligned side by side, said interconnection being made at spaced intervals along the longitudinal axis of said sheets of material to form a plurality of interconnected square barrier segments, the four sides of each of said barrier segments being formed by two of said sheets, said sheets having a specific gravity less than water;
  (b) pulling the formed barrier segments into the body of water; and
  (c) securing the corners of those of said barrier segments about the periphery of the barrier grid structure to prevent lateral movement of said barrier segments over the surface of the water, a majority of the barrier segments floating in the body of water off the bottom thereof, a top edge of the barrier segments extending above the surface of the water.

9. A method in accordance with claim 8, wherein said interconnecting step includes forming V-folds in said sheets of material and fastening adjacent ones of said V-folds by use of a clip apparatus.

10. A method in accordance with claim 9, wherein said interconnecting step includes using a barbed clip appartus.

11. A method in accordance with claim 8, wherein said securing step includes necessarily securing said barrier segments such that a portion of said barrier grid structure can be submerged by a floating harvesting device.

* * * * *

UNITED STATES PATENT AND TRADEMARK OFFICE
CERTIFICATE OF CORRECTION

PATENT NO. : 4,536,988

DATED : August 27, 1985

INVENTOR(S) : Delman R. Hogen

It is certified that error appears in the above-identified patent and that said Letters Patent is hereby corrected as shown below:

```
Column 1, line 15, "wast" should be --waste--;
Column 1, line 29, after "duckweed" insert --plants--;
Column 1, line 42, "However. The" should be --However, the--;
Column 2, line 51, "segments" should be --segment--;
Column 4, line 3, "numeral" should be --numerals--;
Column 4, line 5, "view" should be --views--;
Column 4, line 14, "plane" should be --plan--;
Column 4, line 26, "FIG." should be --FIGS.--;
Column 5, line 24, "0.07" should be --0.7--;
Column 6, line 4, "FIG." should be --FIGS.--;
Column 6, line 36, "Bos" should be --Box--;
Column 7, line 34, "advantages" should be --advantage--;
Column 7, lines 59 and 60, "principle" should be
  --principles--;
Column 7, line 62, "claim" should be --claims--;
Column 8, line 22, "0.07" should be --0.7--;
Column 8, line 32, "enlongated" should be --elongated--.
```

Signed and Sealed this

Fourth Day of November, 1986

[SEAL]

Attest:

DONALD J. QUIGG

Attesting Officer

Commissioner of Patents and Trademarks